United States Patent [19]
Kerkman et al.

[11] Patent Number: 5,917,721
[45] Date of Patent: Jun. 29, 1999

[54] APPARATUS FOR REDUCING THE EFFECTS OF TURN ON DELAY ERRORS IN MOTOR CONTROL

[75] Inventors: Russel J. Kerkman, Milwaukee; David Leggate, New Berlin, both of Wis.

[73] Assignee: Allen-Bradley Company, LLC, Milwaukee, Wis.

[21] Appl. No.: 08/976,188

[22] Filed: Nov. 21, 1997

[51] Int. Cl.[6] .................................................. H02M 7/797
[52] U.S. Cl. ................................................ 363/98; 363/41
[58] Field of Search .................................. 363/41, 95, 96, 363/97, 98, 132, 137

[56] References Cited

U.S. PATENT DOCUMENTS

| | | | |
|---|---|---|---|
| 5,436,819 | 7/1995 | Mikami et al. | 363/41 |
| 5,450,306 | 9/1995 | Garces et al. | 363/41 |
| 5,625,550 | 4/1997 | Leggate et al. | 363/132 |
| 5,627,742 | 5/1997 | Nakata et al. | 363/98 |
| 5,671,130 | 9/1997 | Kerkman et al. | 363/41 |
| 5,699,240 | 12/1997 | Obayashi | 363/98 |
| 5,717,584 | 2/1998 | Rajashekara et al. | 363/98 |
| 5,729,449 | 3/1998 | Takada et al. | 363/98 |
| 5,805,438 | 9/1998 | Takeda et al. | 363/132 |
| 5,811,949 | 9/1998 | Garces | 363/41 |

*Primary Examiner*—Jeffrey Sterrett
*Attorney, Agent, or Firm*—Michael A. Jaskolski; John M. Miller; John J. Horn

[57] ABSTRACT

A method and apparatus for compensating for deviations in the alternating voltage produced by a PWM inverter. The necessary sequence in which inverter components must be triggered results in voltage error pulses that accumulate over time and result in deviations from ideal voltage at motor terminals. By allowing the error pulses to continue and adjusting the trigger times to compensate for the error pulses, the effect of the error pulses is negated and the voltage deviations are eliminated.

9 Claims, 6 Drawing Sheets

APPARATUS FOR REDUCING THE EFFECTS OF TURN ON DELAY ERRORS IN MOTOR CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to variable frequency AC motors. More particularly, the present invention relates to an apparatus to eliminate voltage deviations at motor terminals due to switching time delays in pulse width modulated invertors.

One type of commonly designed induction motor is a three phase motor having three Y-connected stator windings. In this type of motor, each stator winding is connected to an AC voltage source by a separate supply line, the source generating currents therein. Often, an adjustable speed drive (ASD) will be positioned between the voltage source and the motor to control motor speed.

Many ASD configurations include a pulse width modulated (PWM) inverter consisting of a plurality of switching devices and a controller for controlling the inverter. Referring to FIG. 1, an exemplary inverter 10 has six switches 12–17. The switches 12–17 are arranged in series pairs, each pair forming one of three inverter legs 39, 40, and 41. Referring to leg 39, by triggering the switches 12, 13 ON and OFF in a repetitive sequence, leg 39 receives DC voltage 18 and provides the high frequency pulses 60 of FIG. 2 to a motor terminal 31. By triggering the switches in a regulated sequence the inverter can be used to control both the amplitude and frequency of voltage that eventually reach the stator windings.

Referring to FIG. 2, an exemplary sequence of high frequency terminal voltage pulses 60 that inverter 10 might provide to a motor terminal can be observed along with an exemplary low frequency alternating fundamental voltage 62 and related alternating current 69. By varying the widths of the positive portions 63 of each high frequency pulse relative to the widths of the negative portions 64 over a series of high frequency voltage pulses 60, a changing average voltage which alternates sinusoidally can be generated. The changing average voltage defines the low frequency alternating voltage 62 that drives the motor. The low frequency alternating voltage 62 in turn produces a low frequency alternating current 69 that lags the voltage by a phase angle.

Referring to FIG. 3(a), representative waveforms used by a signal generator 20 to generate triggering times for leg 39 may be observed. As well known in the art, a carrier waveform 67 is perfectly periodic and operates at what is known as the carrier frequency. A command voltage waveform 68 is sinusoidal, having a much greater period than the carrier waveform 67.

Referring also to FIGS. 3(b) and 3(c), an upper signal 72 and a lower signal 74 that control the upper and lower switches 12, 13 respectively can be observed. The turn-on $t_{u1}$, $t_{u2}$ and turn-off $t_{o1}$, $t_{o2}$ trigger times of the upper and lower signals 72, 74 come from the intersections of the command waveform 68 and the carrier waveform 67.

When waveform 68 intersects the carrier waveform 67 while the carrier waveform has a positive slope (i.e. during periods $T_p$), upper signal 72 goes OFF and lower signal 74 goes ON. On the other hand, when waveform 68 intersects carrier waveform 67 while the carrier waveform has a negative slope (i.e. during periods $T_n$), upper signal 72 goes ON and lower signal 74 goes OFF. Thus, by comparing carrier waveform 67 to command waveform 68, trigger times can be determined. Signals 72, 74 are provided to the delay module 11.

To implement waveform comparison, typical controllers convert the carrier and command waveforms into times. When command waveform 68 is greater than carrier waveform 67, upper signal 72 is turned ON and when waveform 68 is less than waveform 67, upper signal 72 is turned OFF. Thus, upper signal 72 is ON for a duty cycle during each carrier period T which depends on waveform amplitude A. Amplitude A is normalized to $V_{bus}$ voltage and is known and therefore an upper signal on-time duty cycle DC corresponding to amplitude A can be derived. Once duty cycle DC is identified, trigger times corresponding to duty cycle DC can be identified.

To determine duty cycle DC the following equation is solved:

$$DC = (A + \tfrac{1}{2}) \qquad \text{Eq. 1}$$

where A is the instantaneous command waveform amplitude. For example, where amplitude A is 0.25, duty cycle DC will be 75%. Where amplitude A is −0.25, duty cycle DC will be 25%.

Waveform 67 is represented by a carrier count signal and a direction signal. For the purposes of this explanation it will be assumed that the carrier count counts up from 0 to 100 when traversing between negative and positive carrier peaks (i.e. during positive carrier waveform slope) and counts down from 100 to zero between positive and negative carrier peaks (i.e. during negative carrier waveform slope).

Upper trigger times can be determined by multiplying duty cycle DC by the maximum carrier count. In the present example the maximum carrier count is 100. Assuming a 75% duty cycle DC, the upper trigger times occur when the carrier count is 75 (i.e. .75*100). In FIG. 3(a), the upper trigger times are illustrated as times $t_a$ and $t_b$. Times $t_a$ and $t_b$ and the carrier count are provided to a compare register. The compare register compares times $t_a$ and $t_b$ to the carrier count and when the carrier count equals time $t_a$, upper signal 72 is turned OFF. When the carrier count equals time $t_b$, upper signal 72 is turned ON.

Referring to FIGS. 1 and 3(d), an ideal high frequency voltage pulse 60 resulting from the upper and lower signals 72, 74 in FIGS. 3(b) and 3(c) that might be provided at terminal 31 can be observed. When upper signal 72 is ON and lower signal 74 is OFF, device 12 allows current to flow from high voltage rail 48 to motor terminal 31 thus producing the positive phase 78 of pulse 60 at motor terminal 31. Ideally, when upper signal 72 goes OFF and lower signal 74 goes ON, device 12 immediately turns OFF and device 13 immediately turns ON connecting motor terminal 31 and low voltage rail 49 producing the negative phase 80 of pulse 60 at motor terminal 31. Thus, ideal high frequency voltage pulse 60 is positive when upper signal 72 is ON and is negative when lower signal 74 is ON.

Ideally, when switch 12 turns on, series switch 13 turns OFF, and visa versa. In reality, however, each switch 12, 13 has turn-on and turn-off times that vary depending on the technology used for their construction. Thus, while signals to turn the upper switch 12 ON and the lower switch 13 OFF might be given at the same instant, the lower switch 13 may go ON faster than the upper switch 12 goes OFF thus providing an instantaneous DC short between a high DC rail 48 and a low DC rail 49. Such a DC short can cause irreparable damage to both the inverter and motor components.

To ensure that the series switches of an inverter are never simultaneously on, delay module 11 modifies the upper and lower signals 72, 74 by adding a turn-on delay period prior to the turn-on times $t_{u1}$, $t_{u2}$ of each of the upper and lower signals 72, 74. Referring to FIGS. 3(e) and 3(f), the delay periods produce delayed and shortened upper and lower signals 72 and 74 having delayed turn-on times $t_{u1'}$, $t_{u2'}$.

Referring to FIG. 3(g), while the delay periods protect the motor and inverter components, they produce voltage deviations $_n$ at the motor terminal 31 that produce distorted positive and negative pulses 82, 84 and a distorted high frequency voltage pulse 86. These deviations $_n$ can best be understood by referring to FIGS. 1, 2, and 3(e)–3(g).

Referring to FIGS. 1, 2 and 3(e)–3(g), while the terminal current 69 at motor terminal 31 might be positive, the high frequency voltage pulses 60 will be oscillating from positive to negative phase as the delayed upper and lower signals 72', 74' turn the switches 12, 13 ON and OFF. Thus, while the terminal current 69 is positive, two signal states may occur. First, the upper signal 72 may be OFF while the lower signal 74 is ON and second the upper signal 72 may be ON while the lower signal 74 is OFF. Likewise, when the current 69 is negative, the same two signal states may exist.

When the terminal current is positive, and switch 12 is ON while switch 13 is OFF, the high voltage rail 48 is connected to motor terminal 31. Diode 24 blocks the flow of current to the low voltage rail 49. When the upper switch 12 turns OFF at $t_{o1}$, both series switches 12, 13 remain OFF during the delay period. As well known in the art, motors have internal inductance. Because of motor inductance, the terminal current 69 caused by the low frequency alternating voltage 62 cannot change directions immediately to become negative each time the high frequency voltage pulse 60 changes from the positive 63 to the negative 64 phase. The current remains positive and diode 24 immediately begins to conduct at $t_{o1}$, connecting the low voltage rail 49 to motor terminal 31 as desired. Hence, the terminal voltage goes negative at the desired time $t_{o1}$ even though the turn-on time $t_{u2}$ of the delayed lower signal 74 does not occur until after the delay period.

On the other hand, when switch 12 is initially OFF and switch 13 is ON and the terminal current 69 is positive, the low voltage rail 49 is connected through switch 13 to motor terminal 31 as desired and the resulting terminal voltage pulse 86 is in the negative phase 84 at terminal 31. When switching device 13 turns OFF at $t_{o2}$, as the positive terminal current 69 cannot immediately reverse itself, diode 24 continues to conduct and low voltage rail 49 remains connected to motor terminal 31 for the duration of delay period Thus, during the delay period, instead of having positive phase voltage at terminal 31 as desired, the negative phase 84 of the resulting terminal voltage pulse is extended at terminal 31 until the turn-on time $t_{u1}$ of the delayed upper signal 72'.

Comparing FIGS. 3(d) and 3(g), the resulting terminal voltage pulses 86 have wider negative phases 84 and narrower positive phases 82 than the ideal voltage pulses 60. A voltage deviation $_n$ occurs each time the lower switch 13 is turned OFF and the terminal current 69 is positive. The cumulative effect of these voltage deviations $_n$ cause torque irregularities and distort the low frequency alternating fundamental voltage 62 and current 69 of FIG. 2.

A similar type of error is produced when the terminal current 69 is negative and the upper switch 12 turns from ON to OFF. Referring to FIGS. 4(a)–4(c), delayed upper and lower signals 88, 90 and a resulting terminal voltage pulse sequence 92 having errors $_p$ can be compared.

Referring also to FIGS. 1, 2 and 3(a), when the terminal current 69 is negative and the lower signal 90 turns OFF at $t_{o2}$ turning switch 13 OFF, diode 23 immediately connects high voltage rail 48 to terminal 31. While both switches 12, 13 are off, the inverter is in a transition state. Thus, at turn-off time $t_{o2}$, resultant terminal voltage pulse 92 turns positive as desired. No error results during this switching sequence.

However, when the terminal current 69 is negative and the upper signal 88 turns OFF at $t_{o1}$ turning switch 12 OFF, as both switches 12 and 13 are OFF and the terminal current 69 cannot reverse immediately to become positive, diode 23 continues to conduct which connects high voltage rail 48 to terminal 31. Thus, during, instead of connecting to the low voltage rail 49 and going negative as desired, the motor terminal 31 remains connected to the positive rail 48 and the resultant terminal voltage pulse 92 remains positive causing error $_p$ to result.

Referring to FIGS. 2, 3(g), and 4(c), during both negative and positive phases of the terminal current 69, the delay periods produce voltage distorting errors $_n$ and $_p$. While each individual distortion does not appreciably affect the fundamental alternating voltage, accumulated deviations do distort the alternating voltage. This is particularly true in applications where the frequency of the high frequency pulses is increased because each additional pulse creates an additional deviation. Accumulated deviations produce torque pulsations, reduce fundamental output voltage, and distorted stator winding currents, all of which are undesirable.

One solution to compensate for the deviations is described in U.S. Pat. No. 5,625,550 which issued to the present inventors on Apr. 29, 1997. That patent describes a method for compensating for deviations in the alternating voltage produced by a PWM inverter by allowing error pulses to occur and adjusting the trigger times of inverter switches to compensate for the error pulses. For example, if a specific sequence of trigger times will result in an error pulse which delays a desired pulse by one micro-second, the trigger time sequence is modified such that the specific sequence occurs one micro-second earlier. Then, when the error pulse occurs, the error pulse in conjunction with the modified switching sequence results in a pulse which occurs at the desired time. In this way, the method described in that patent negates the effect of the error pulses.

The U.S. Pat. No. 5,625,550 patent teaches both symmetrical and unsymmetrical methods of modifying pulses. According to the unsymmetrical method only trigger times directly associated with turn on delay errors are modified. However, according to the symmetrical method, associated pairs of trigger times are modified to eliminate delay errors wherein associated pairs of times each consist of an upper switch off time and a follow on time. For example, in FIGS. 3(a) and 3(g), both off time $t_a$ and on time $t_b$ are symmetrically modified to eliminate error $_n$.

Although a bit more complicated, the symmetrical method is extremely important as many processors cannot modify a trigger time during a carrier waveform period T and must modify signals symmetrically with respect to carrier waveform 67. Processors so limited will be referred to herein as carrier signal centering processors.

While the U.S. Pat. No. 5,625,550 patent teaches advantageous methods, that patent fails to teach or suggest a way to implement unsymmetrical compensation using a typical carrier signal centering processor.

In addition, even where a more sophisticated processor is provided which is capable of implementing unsymmetrical compensation or where a carrier signal centering processor is used to facilitate symmetrical compensation, such compensation taxes the abilities of a typical processor. This is true because most controller processors are bare bones type processors chosen to have only the computing capability required to facilitate typical inverter required processes. For example, typical processors are configured primarily to perform the task of generating command signals in the form of trigger times.

Furthermore, the method of the U.S. Pat. No. 5,625,550 patent can result in terminal voltages which lag commanded voltages by a propagation or lag period. According to the U.S. Pat. No. 5,625,550 patent, after a trigger time is identified, a lag period occurs because the trigger time has to be shifted providing a shifted time and then the trigger and shifted times have to be stored. Next, current polarity and carrier slope have to be identified and used to determine which time, the original trigger time or the modified time, should be selected. Thereafter, time selection takes place and the selected time is passed to the delay module. The resulting trigger time is center aligned with the carrier thus causing a phase shift in the applied motor voltage.

Therefore, it would be advantageous to have an apparatus which, in conjunction with a simple processor, compensates for turn-on delay errors by modifying trigger times of PWM switches to compensate for triggering time errors without overtaxing the controller microprocessor.

BRIEF SUMMARY OF THE INVENTION

The present invention provides a hardware compensator which cooperates with a simple controller processor such that trigger times can be modified to compensate for turn on delay errors without overburdening the processor and reduces or eliminates the phase shift induced by symmetric center aligned PWM generation.

The processor required for the present invention need only generate trigger times for comparison to a carrier count. The trigger times are intercepted by a dead time compensator which includes a storer, a decoder and a selector. The storer generates add, subtract and preserve trigger times. The preserve trigger time is the original trigger time. The add trigger time is the trigger time plus a period equal to a turn on delay period. The subtract trigger time is the trigger time minus a period equal to the delay period.

The decoder receives current polarity signals and a direction signal indicating the direction (i.e. up or down) in which the carrier count is counting. Based on the polarity signals and the direction signal, the decoder generates decision signals indicating if and how the trigger time should be modified. When current polarity is positive and the carrier count is counting up or current polarity is negative and the carrier count is counting down, the decision signals indicate that the trigger time should be unchanged or preserved. When current polarity is positive and the carrier count is counting down, the decision signals indicate that the trigger time should be changed by increasing trigger time (which is earlier in time). When current polarity is negative and the carrier count is counting up, the decision signals indicate that the trigger time should be the delay trigger time (which is also earlier in time).

The selector receives the decision signals and the add, preserve and subtract trigger times and passes one of the add, subtract or preserve times as a modified trigger time. The time provided as the modified trigger time is determined by the decision signals. The modified trigger time is provided to a compare register for comparison to the carrier count to generate a trigger signal. The trigger signal is provided directly to a delay module.

Thus, according to the present invention, instead of comparing trigger times to the carrier count to generate carrier centered trigger signals, trigger times are selected prior to comparison to the carrier count such that trigger signals generated compensate for turn on delay errors.

One object of the invention is to reduce the delay between trigger signal generation and presentation of the trigger signal to the delay module. By modifying trigger times prior to comparison instead of modifying trigger signals at the peaks and valleys of the carrier, the delay period is reduced thereby resulting in better system response.

Another object is to minimize the number of calculations and modifications which must be performed by the processor thereby facilitating implementation of precise turn on delay compensation with conventional processors. Not only can the inventive hardware configuration be used with inexpensive processors, the configuration can also be added to existing controller systems which have simple processors to facilitate turn on delay compensation. The only signals required from the processor are trigger times.

A related object is to implement turn on delay compensation inexpensively. The preferred hardware configuration only requires a simple decoder, a storer and a selector for each motor phase.

One other object is to correct for turn on delay errors prior to the errors occurring. The delay period may be determined and its effect is known. By modifying trigger times, the timing of the delay periods can be adjusted and resulting turn on delay errors can be timed to produce desired terminal fundamental voltage.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Theory

Figure 1:
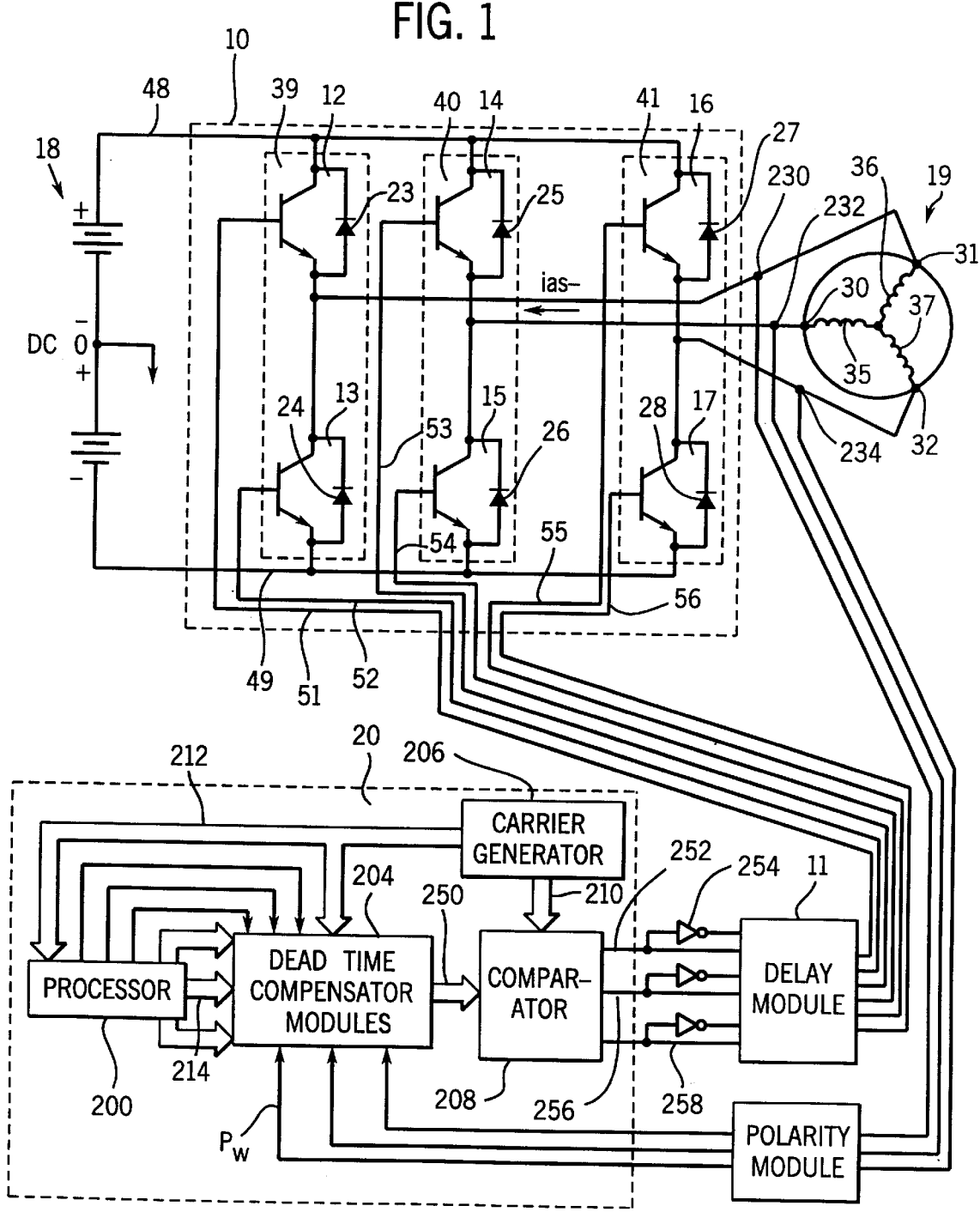
FIG. 1 is a schematic diagram of a controller and a generator which incorporates the present invention.
Figure 2:
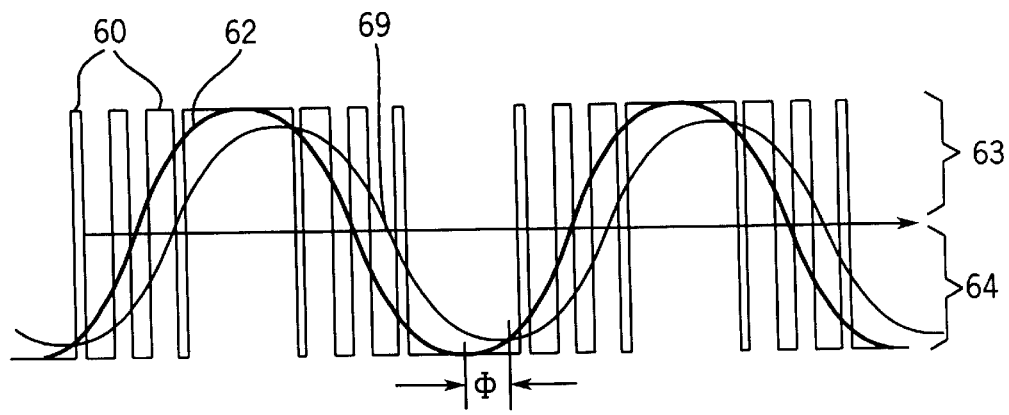
FIG. 2 is a graph illustrating high frequency pulses and a resulting low frequency alternating voltage applied to a stator winding by a PWM inverter.
Figure 3A:
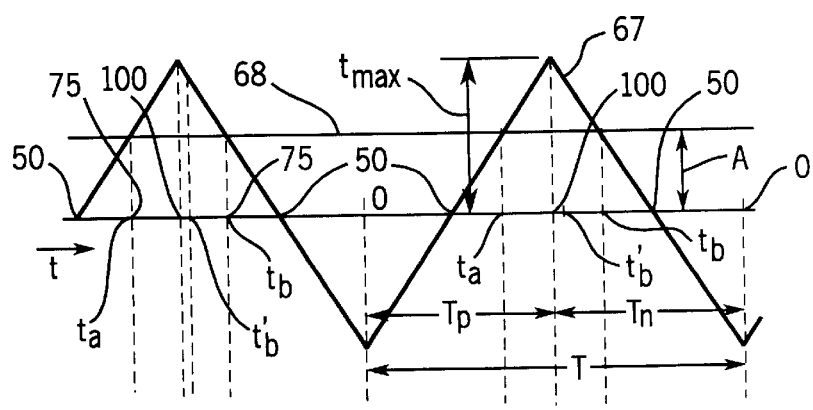
FIG. 3(*a*) is a graph illustrating the waveforms used by a PWM inverter to produce the high frequency pulses shown in FIG. 2, FIGS. 3(*b*), 3(*c*), 3(*e*) and 3(*f*) are graphs illustrating PWM firing pulses and FIGS. 3(*d*), 3(*g*) and 3(*h*) are graphs illustrating high frequency pulses delivered to a motor terminal.
Figure 3B:
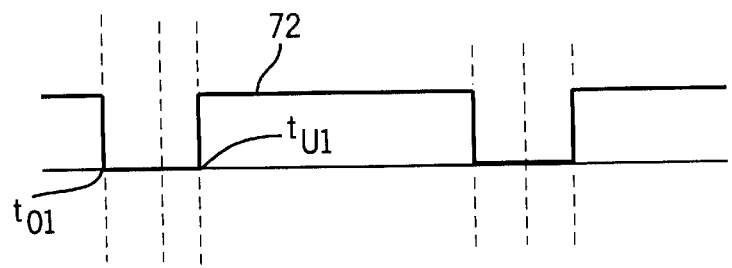
Figure 3C:
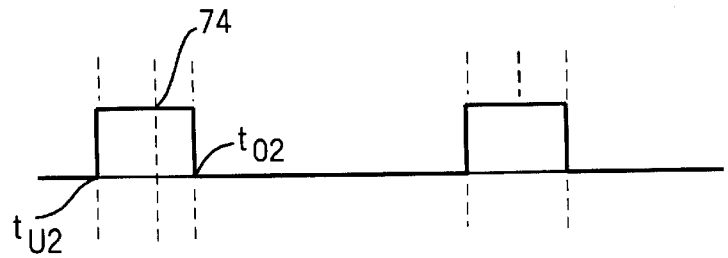
Figure 3D:
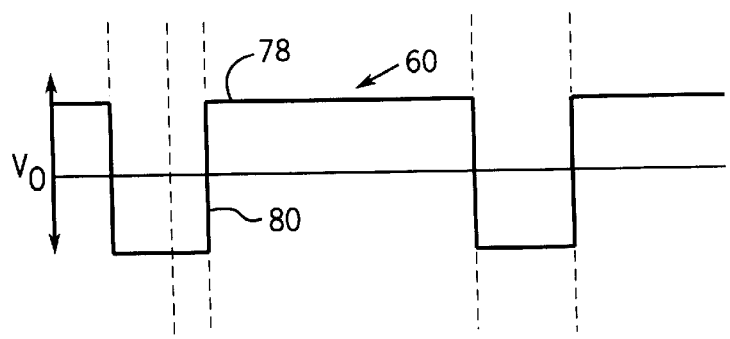
Figure 3E:
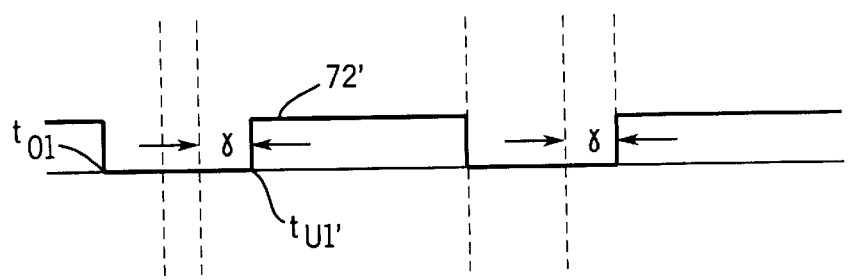
Figure 3F:
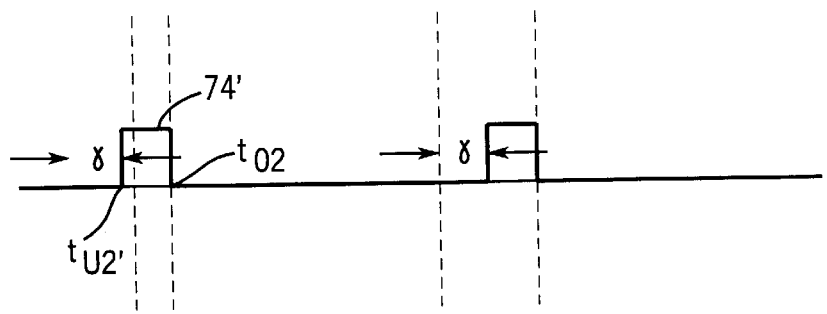

Referring to FIGS. 1, 3(a), and 3(d), with carrier and command waveforms 67, 68, respectively, upper switch off trigger time $t_a$ and on trigger time $t_b$ ideally cause high frequency voltage pulse 60 at motor terminal 31. Unfortunately, as explained above and referring also to FIG. 3(g), with a positive terminal current, when waveforms 67 and 68 intersect while waveform 67 has a negative slope, despite upper switch on trigger time $t_b$, an error $_n$ occurs in the high frequency pulse such that terminal 31 is connected to the negative DC bus 49 and an erroneous high frequency pulse 86 results. The period of error $_n$ is equal to the turn on delay period.

Referring still to FIGS. 3(a) and 3(d), according to the present invention, to generate desired pulse 60, when current polarity is positive and carrier waveform 67 slope is negative, delay period is added to upper switch on trigger time $t_b$ to generate modified on trigger time $t_b'$. Modified trigger time $t_b'$ is provided to a compare register to generate a high frequency voltage pulse.

Figure 3G:
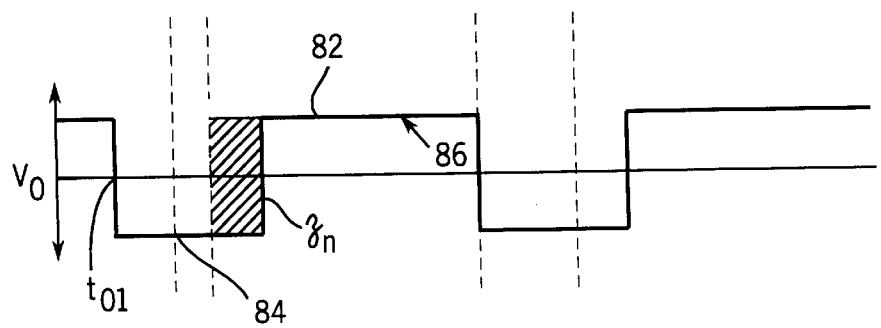
Figure 3H:
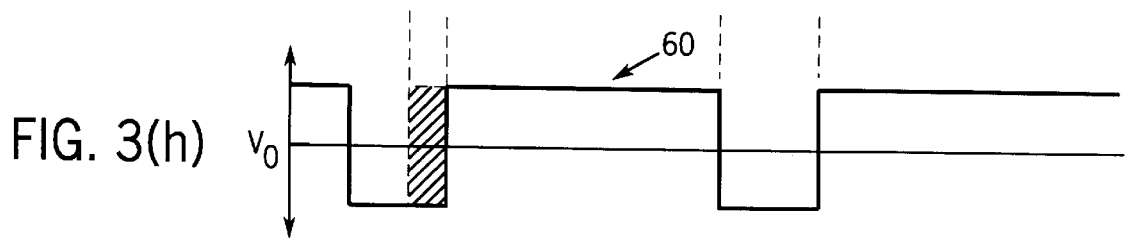
Figure 4A:
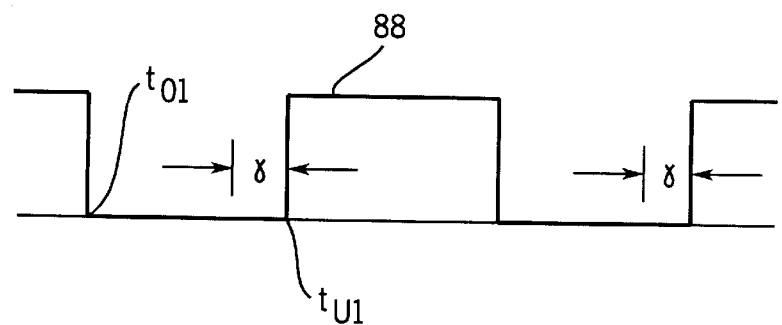
FIGS. 4(*a*) and 4(*b*) are graphs illustrating PWM firing pulses and FIG. 4(*c*) is a graph illustrating high frequency pulses.
Figure 4B:
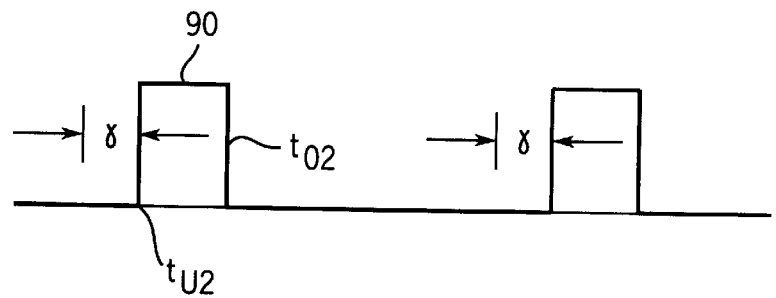
Figure 4C:
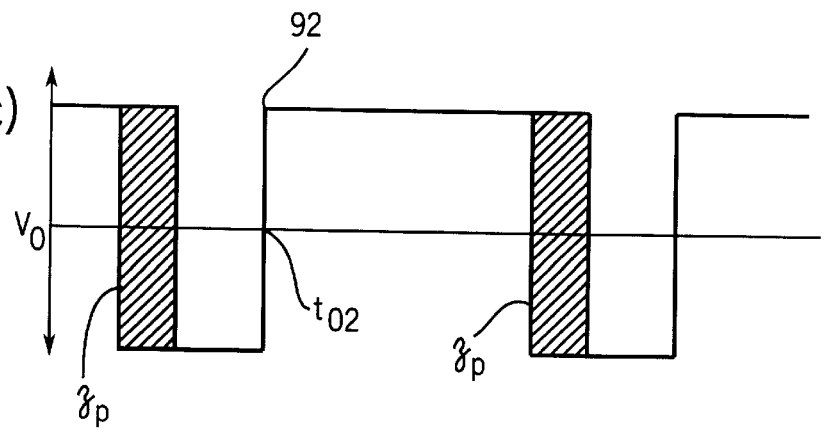

Referring also to FIG. 3(g), when the high frequency pulse is generated, error $_n$ still occurs. However, because modified trigger time $t_b'$ is shifted earlier in time by period, error $_n$ which is long, results in the desired high frequency pulse 60.

Figure 5A:
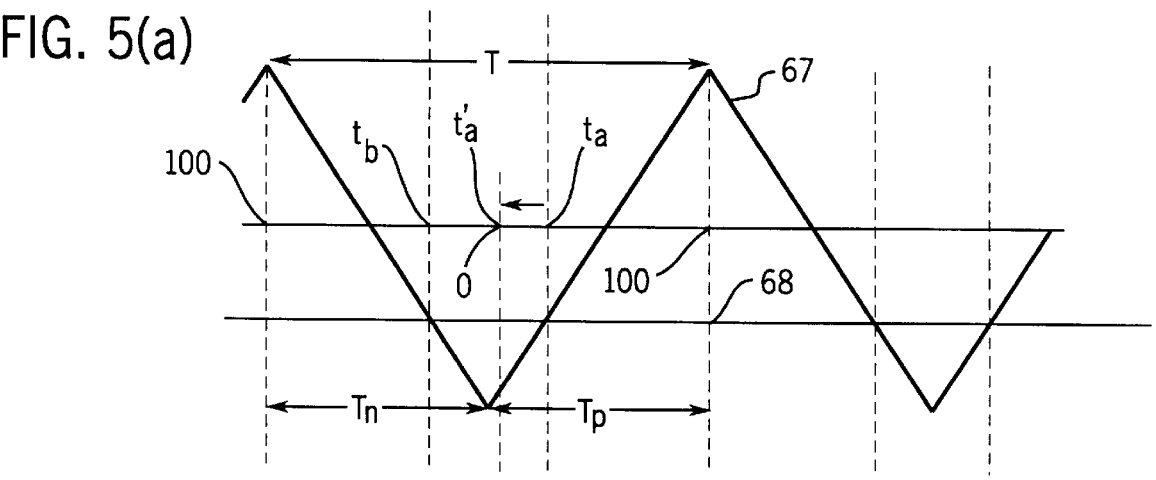
FIGS. 5(*a*) is similar to FIG. 3(*a*) and FIGS. 5(*b*), 5(*c*) and 5(*d*) are graphs illustrating high frequency pulses delivered to a motor terminal.
Figure 5B:
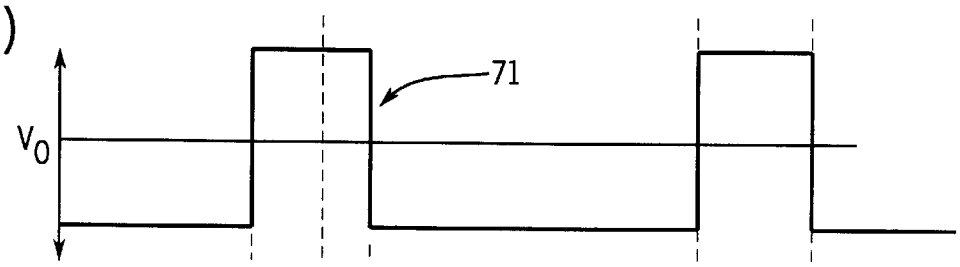
Figure 5C:
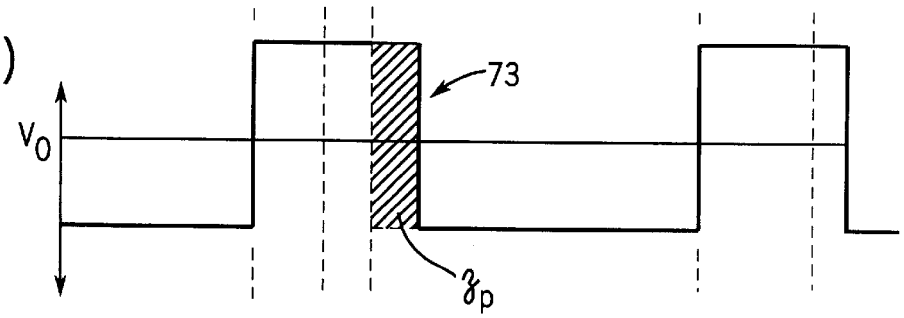

Similarly, referring to FIGS. 5(a), and 5(b), with carrier and command waveforms 67, 68, respectively, upper switch on trigger time $t_b$ and off trigger time $t_a$ ideally cause high frequency voltage pulse 71 at terminal 31. Unfortunately, as explained above and referring also to FIG. 5(c), with a negative terminal current, when waveforms 67 and 68 intersect while waveform 67 has a positive slope, despite upper switch off trigger time $t_a$, an error $_p$ occurs in the high frequency pulse such that terminal 31 is connected to positive DC bus 48 and an erroneous high frequency pulse 73 results. The period of error $_p$ is equal to delay period.

Figure 5D:
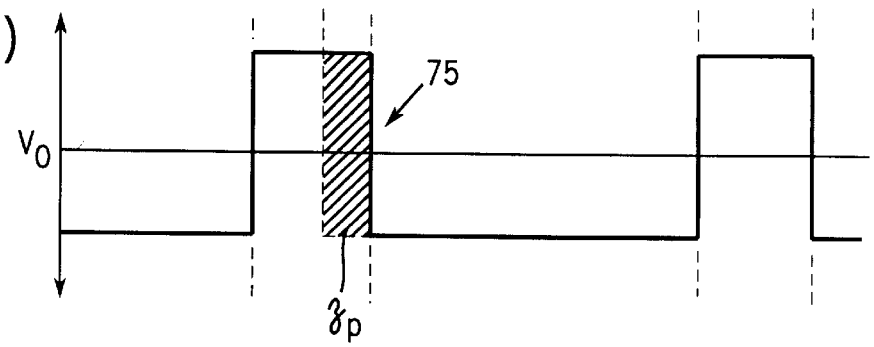

Referring still to FIGS. 5(a) and 5(d), according to the present invention, to generate desired pulse 71, when current polarity is negative and carrier waveform 67 slope is positive, delay period is subtracted from upper switch off trigger time $t_a$ to generate modified off trigger time $t_a'$. Modified trigger time $t_a'$ is provided to a compare register to generate a high frequency voltage pulse.

Referring also to FIG. 5(d), when high frequency pulse 75 is generated, error $_p$ still occurs. However, because modified trigger time $t_a'$ is shifted earlier in time by period, the error $_p$ which is long, results in the desired high frequency pulse 73.

Thus, when current polarity is positive and carrier waveform 67 slope is negative, upper switch on trigger time is expedited by delay period and when current polarity is negative and carrier waveform 67 slope is positive, upper switch off trigger time is expedited by delay period.

B. Hardware and Operation

The present invention will be described in the context of the exemplary PWM inverter 10 shown in FIG. 1. The inverter 10 is shown connected to a delay module 11, a DC voltage source 18, and a motor 19. The inverter consists of six solid state switching devices 12–17 (BJT, GTO, IGBT or other transistor technology devices may be used) arranged in series pairs, each switching device 12–17 being coupled with an inverse parallel connected diode 23–29.

Each series arranged pair of switching devices 12 and 13, 14 and 15, and 16 and 17, make up a separate leg 39, 40 or 41 of inverter 10 and have a common node which is electrically connected to a unique motor terminal 30, 31, or 32 (and thus to a unique stator winding 35, 36, or 37). Each switching device 12–17 is also electrically connected by a firing line 51–56 to the delay module 11 and indirectly through the delay module to a signal generator 20. A split DC voltage source 18 creates a high voltage rail 48 and a low voltage rail 49 and each leg 39, 40, 41 connects the high voltage rail 48 to the low voltage rail 49.

To avoid repetitive disclosure, the PWM inverter 10 will be explained by referring only to leg 39 and signals which are used to control leg 39 as all three legs 39, 40, and 41 of the inverter operate in the same manner.

Signal generator 20 and delay module 11 operate together to turn switches 12, 13 ON and OFF in a repetitive sequence that alternately connects the high and low voltage rails 48 and 49 to, and produces a series of high frequency voltage pulses at, terminal 31. The high frequency voltage pulses average over a given period to produce a low frequency alternating voltage at terminal 31. The alternating voltage in turn causes an alternating current through terminal 31.

Three current sensors (e.g. Hall effect) 230, 232 and 234 are linked, a separate sensor to each supply line between inverter 10 to motor 19. Each sensor 230, 232 and 234 provides a current feedback signal indicating instantaneous current level in an associated line. The current signals are provided to a polarity module 236 which determines the polarity of each received current (e.g. may identify current zero crossing points) and provides three separate polarity signals to generator 20, a separate polarity signal corresponding to each of the sensed currents. The polarity signal corresponding to current provided by inverter leg 39 is referenced herein as signal Pw.

To generate trigger signals for controlling inverter 10, generator 20 includes a central processing unit CPU referred to herein as a processor 200, a dead time compensator module 204, a carrier generator 206 and a comparator 208. Referring to FIG. 3(a), to simplify this explanation, operation of generator 20 will be described in the context of the exemplary carrier and command waveforms 67, 68, respectively, wherein waveform 67 has a maximum amplitude tmax and a 200 count p.u. period which is divisible into separate up (i.e. from 0 to 100) and down (from 100 to 0) counts corresponding to positive and negative sloped half cycles of waveform 67, respectively. Waveform 68 is sinusoidal and has an instantaneous amplitude A. It will be assumed that amplitude A is 0.25 p.u. at both times $t_a$ and $t_b$.

As well known by those skilled in the art, three command waveforms like waveform 68 are generated, a separate command waveform for controlling each of the three inverter legs 39, 40 and 41. As each of the command waveforms is processed in an identical fashion, only processing of waveform 68 which corresponds to leg 39 is explained here.

Carrier generator 206 provides two different but related signals. A first signal provided by generator 206 is a carrier count signal which repetitively counts up and then down between lower and upper count values so as to define position along waveform 67. In FIG. 3(a), the carrier count counts up from 0 to 100 during positive half cycles Tp of waveform 67 and counts down from 100 to 0 during negative half cycles Tn of waveform 67. The carrier count signal is provided to comparator 208 via a bus 210.

The second signal provided by generator 206 is a direction signal Dr which indicates the instantaneous direction, up or down, in which the carrier count is counting. During positive half cycles Tp of waveform 67, direction signal Dr is high indicating that the carrier count is counting up and during negative half cycles Tn direction signal Dr is low indicating that the carrier count is counting down. Direction signal Dr is provided to both processor 200 and compensator module 204 via a bus 212.

Referring again to FIG. 3(a), processor 200 generates upper switch off and on trigger times $t_a$ and $t_b$ corresponding to the instances when waveforms 67 and 68 intersect. To this end, processor 200 is programmed with maximum carrier waveform amplitude tmax. Processor 200 internally generates three sinusoidal command waveforms including waveform 68 for comparison to carrier waveform 67. Instead of actually generating waveform 68, processor 200 generates a time dependent amplitude signal A indicating the instantaneous amplitude of a desired command waveform.

After direction signal Dr is received and amplitude A is generated, processor 200 determines an upper switch on-time duty cycle DC according to Equation 1 above. In the present example, because amplitude A is 0.25, Equation 1 yields a 75% duty cycle DC.

Upper switch trigger on and off times can be determined by multiplying duty cycle DC by the maximum carrier count. In the present example the maximum carrier count is 100. With a 75% duty cycle DC, the upper switch off trigger time $t_a$ occurs when the carrier count is counting up from 0 to 100 and reaches 75 (i.e. .75*100) and the upper switch trigger off time occurs when the carrier count is counting down from 100 to zero and reaches 75. Times $t_a$ and $t_b$ are provided to compensator module 204 via a bus 214.

Figure 6:
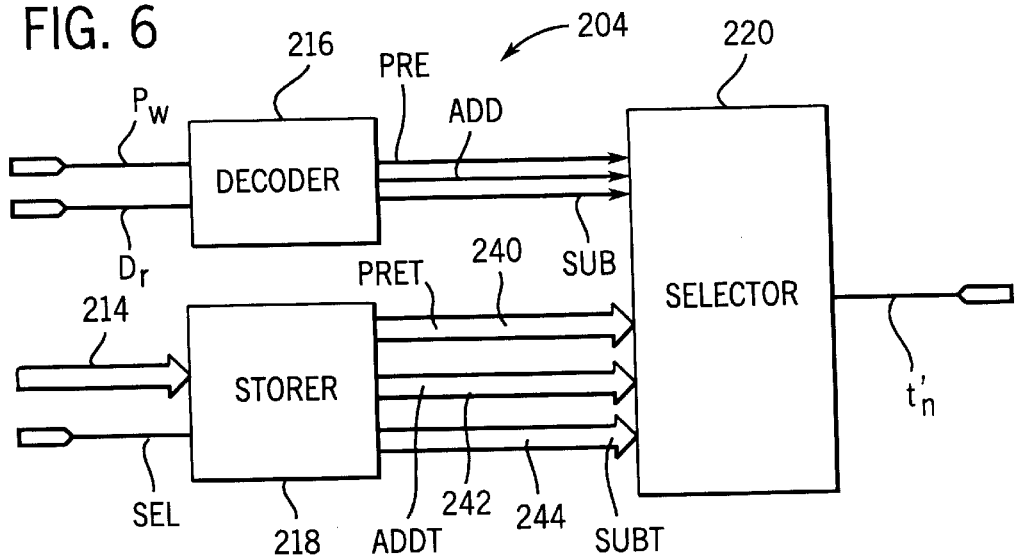
FIGS. 6 is a block diagram illustrating components of the deadtime compensator of FIG. 1.

Referring now to FIG. 6, module 204 includes a decoder 216, a storer 218 and a selector 220. Decoder 216 receives polarity signal Pw and direction signal Dr and generates decision signals including a preserve signal PRE, an add signal ADD and a subtract signal SUB which are provided to selector 220. A high signal PRE indicates that a corresponding trigger time should not be changed. A high signal ADD indicates that a corresponding trigger signal should be altered by adding a count equal to delay period. A high signal SUB indicates that a corresponding trigger time should be altered by subtracting a count equal to delay period.

Figure 7:
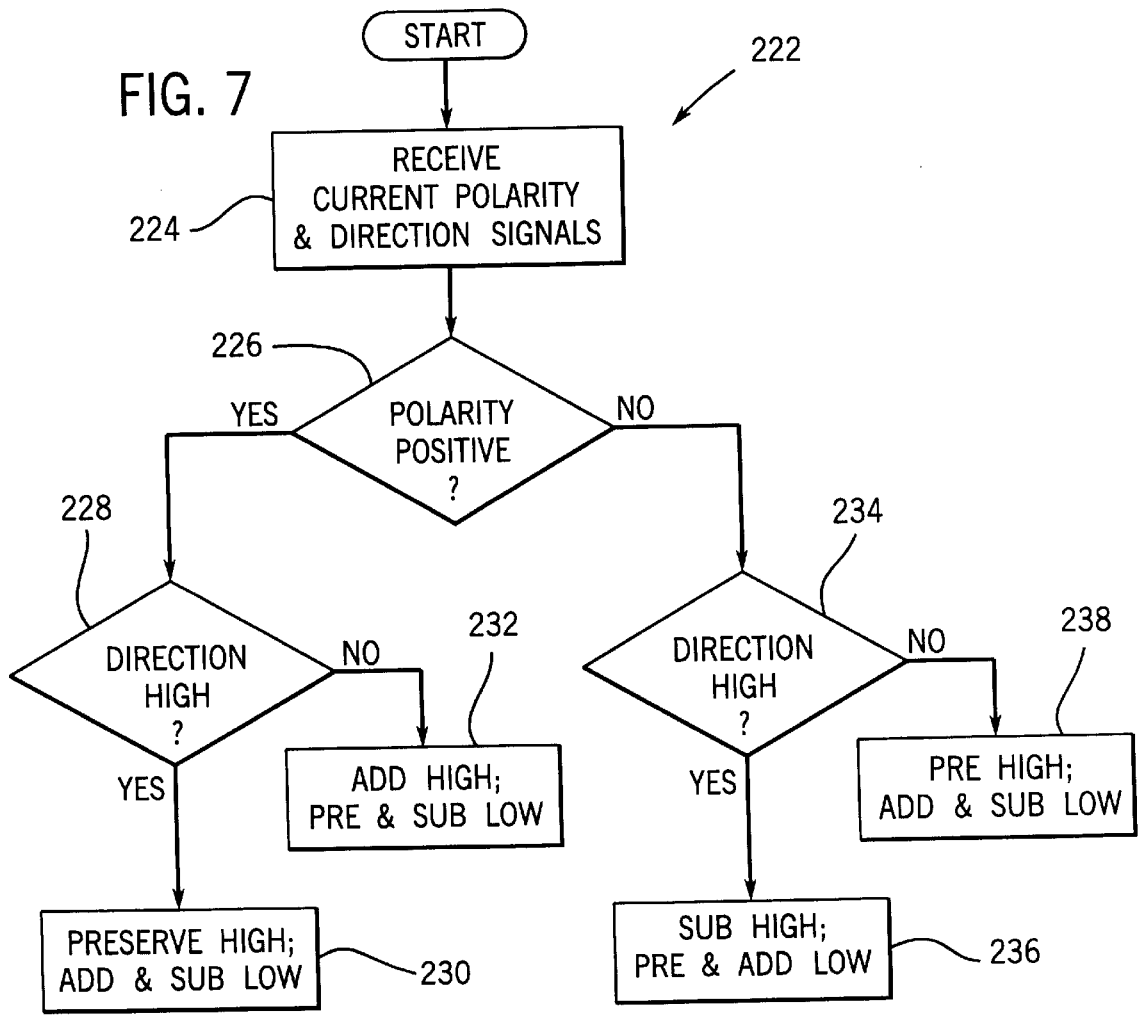
FIGS. 7 is a flow chart illustrating operation of the decoder of FIG. 6.

Referring also to FIG. 7 operation of decoder 216 is illustrated as a flow chart 222. After decoder 216 receives polarity signal Pw and direction signal Dr at process block 224, at decision block 226 decoder 216 determines if polarity signal Pw is positive or negative. If signal Pw is positive, at block 228, decoder determines if direction signal Dr is high (indicating carrier count is counting up and a positive carrier waveform slope) or low (indicating carrier count is counting down and a negative carrier slope). If signal Dr is high, decoder 216 generates a high preserve signal PRE and low signals ADD and SUB at process block 230. If signal DR is low, decoder 216 generates a high signal ADD and low signals PRE and SUB at block 232.

Referring again to block 226, if signal Pw is negative, at block 234, decoder 216 determines if direction signal Dr is high (indicating carrier count is counting up and a positive carrier waveform slope) or low (indicating carrier count is counting down and a negative carrier slope). If signal Dr is high, decoder 216 generates a high signal SUB and low ADD and PRE signals at process block 236. If signal DR is low, decoder 216 generates a high signal PRE and low signals ADD and SUB at block 238.

An example of how decoder 216 operates is instructive. Referring to FIGS. 3(a) and 6, with waveforms 67 and 68 the initial off trigger time is $t_a$ and the initial on trigger time is $t_b$ and polarity signal Pw is positive. In this case control passes down to decision block 228. When waveform 67 slope is positive during periods Tp, direction signal DR is high and control passes through block 228 to block 230 where the preserve signal PRE is set high indicating that the corresponding trigger time $t_a$ should not be changed.

However, when waveform 67 slope is negative during periods Tn, signal DR is low and control passes through block 228 to block 232 where signal ADD is set high indicating that the corresponding trigger time $t_b$ should be changed by adding a count equal to delay period. In the example, assuming initial trigger time $t_b$ was 75 and delay period is equal to 10, modified on trigger time $t_b'$ would be 85. Because the carrier count counts down during periods Tn, count 85 is reached prior to count 75 and therefore modified on trigger time $t_b'$ shifts error $_n$ back in time as desired.

Referring to FIGS. 5(a) and 6, with waveforms 67 and 68 the initial off trigger time is $t_a$ and the initial on trigger time is $t_b$ and polarity signal Pw is negative. In this case control passes down to decision block 234. When waveform 67 slope is negative, signal DR is low and control passes through block 234 to block 238 where the preserve signal PRE is set high indicating that the corresponding trigger time $t_b$ should not be changed.

However, when waveform 67 slope is positive, signal DR is high and control passes through block 234 to block 236 where signal SUB is set high indicating that the corresponding trigger time $t_a$ should be changed by subtracting a count equal to delay period. In the example, assuming initial trigger time $t_a$ was 25 and delay period is equal to 10 count, modified on trigger time $t_a'$ would be 15. Because the carrier count counts up during positive slope sections of waveform 67, count 15 is reached prior to count 25 and therefore modified off trigger time $t_a'$ shifts error $_p$ back in time as desired.

Referring still to FIG. 6, storer 218 is programmed with delay period and, in a preferred embodiment, is provided with trigger times from processor 200 via bus 214 (see FIG. 1). Upon receiving a trigger time, storer 218 adds delay period to the trigger time generating an add trigger time ADDT and subtracts delay period from the trigger time generating a subtract trigger time SUBT. The initial trigger time is stored as a preserve trigger time PRET and the add and subtract times ADDT and SUBT are also stored. Each of times PRET, ADDT and SUBT are made available to selector 220 on separate busses 240, 242 and 246.

Selector 220 receives all of times PRET, ADDT and SUBT and decision signals PRE, ADD and SUB and uses signals PRE, ADD and SUB to determine which one of times PRET, ADDT or SUBT should be passed on as a modified trigger time $t_n'$ (where n is a or b).

When add signal ADD is high, modified trigger time $t_n'$ is set equal to time ADDT. When subtract signal SUB is high, modified trigger time $t_n'$ is set equal to time SUBT. When preserve signal PRE is high, modified trigger time $t_n'$ is set equal to time PRET.

Referring again to FIG. 1, the modified trigger time $t_n'$ is provided to comparator 208 via a bus 250. Comparator 208 compares modified time $t_n'$ to the carrier count and, when time $t_n'$ is equal to the carrier count, comparator 208 generates a trigger signal for upper switch 12 on line 252. The trigger signal is inverted by inverter 254 providing a lower trigger signal. Both the lower and upper trigger signals are provided to module 11 for delays. Similar trigger signals are provided to module 11 for upper switches 14 and 16 via lines 256 and 258.

C. Additional Embodiment and Operation

In another preferred embodiment of the present invention, referring again to FIGS. 1 and 6, instead of having processor 200 provide only the initial trigger times, processor 200 may be programmed to provide each of trigger times ADDT, SUBT and PRET to storer 218 via a serial bus 214. In this case, processor 200 also provides a select signal SEL to storer 218 via a line 240. Signal SEL is synchronized with times ADDT, SUBT and PRET, indicating to storer 218 which of times ADDT, SUBT or PRET is instantaneously being received on bus 214. Storer 218 simply stores times ADDT, SUBT and PRET in separate registers accessible to selector 220 via busses 240, 242 and 244.

Many motor controller processors are only capable of generating trigger times (i.e. on and off trigger times $t_a$ and $t_b$) which are carrier signal centered. Carrier signal centered means that associated off trigger time $t_a$ and on trigger time $t_b$ are equispaced in time from a maximum carrier amplitude tmax therebetween. For example, when the model 80C 196 microelectronic processor as supplied by Intel Corporation of Santa Clara, Calif. is operating in mode 0, it can only alter pluses once during a carrier signal period and cannot interrupt a pulse during each carrier half cycle to modifying on or off trigger times.

With carrier signal centering processors implementation of the invention is slightly different because changes to one trigger time affect an associated trigger time. For example, referring again to FIG. 3(a), when trigger on time $t_b$ is altered by adding to time $t_b$ to generate time ADDT, in order to maintain a centered signal 72 (see FIG. 3(b)), a carrier signal centering processor modifies both times $t_a$ and $t_b$. Time $t_b$ is altered by adding period /2. Similarly, time $t_a$ is altered by adding period /2.

Clearly, modification by period /2 generates incorrect turn on delay compensation. For example, referring again to FIG. 3(a), at time $t_a$, time PRET is $t_a$, time ADDT is ($t_a$+/2) and time SUBT is ($t_a$-/2). Selector 220 receives times PRET, ADDT and SUBT and only preserve signal PRE is high (i.e. Pw is high and DR is high). In this case, time PRET is passed as modified trigger time $t_n$' as desired.

However, at time $t_b$, time PRET is $t_b$, time ADDT is ($t_b$+/2) and time SUBT is ($t_b$+/2). Selector 220 receives times PRET, ADDT and SUBT and only add signal ADD is high (i.e. Pw is high and DR is low). In this case, erroneous time ADDT (i.e. $t_b$+/2) is passed as modified trigger time $t_n$'. In the example above, where time $t_b$ is 75 and period is 10, modified trigger time $t_n$' would be 80 instead of the desired 85 (i.e. instead of $t_b$+).

Similarly, referring to FIG. 5(a), while polarity signal Pw is negative, during periods Tp when direction signal Dr is high, an erroneous trigger time is provided as time $t_n$'. Here, at time $t_a$, time PRET is $t_a$, time ADDT is ($t_a$+/2) and time SUBT is ($t_a$-/2). Because signal Pw is low and direction signal Dr is high, only subtract signal SUB is high and therefore time SUBT (i.e. $t_a$-/2) is passed as modified trigger time $t_n$' instead of the desired time $t_b$+.

For this reason, when a carrier signal centering processor is used to generate times PRET, ADDT and SUBT, instead of modifying the initial times $t_a$ and $t_b$ by to generate times ADDT and SUBT, times $t_a$ and $t_b$ are modified by 2. Processor 200 then splits period 2 in half and modifies times $t_a$ and $t_b$ each by. For example, referring yet again to FIG. 3(a), at time $t_a$, when times $t_a$ and $t_b$ together are modified by 2, time PRET is $t_a$, time ADDT is ($t_a$+) and time SUBT is ($t_a$-). Time PRET is passed as modified trigger time $t_n$' as desired. At time $t_b$, time PRET is $t_b$, time ADDT is ($t_b$+) and time SUBT is ($t_b$-). Time ADDT is passed as modified trigger time $t_n$' as desired.

It should be understood that the methods and apparatuses described above are only exemplary and do not limit the scope of the invention and that various modifications could be made by those skilled in the art that would fall under the scope of the invention.

To apprise the public of the scope of this invention, we make the following claims:

We claim:

1. An apparatus for use with a processor, a carrier signal generator, a comparator, three current polarity sensors and an inverter for controlling a three phase motor, the signal generator providing a carrier count signal and a direction signal, the direction signal being high when the carrier count is counting up and low when the carrier count is counting down, the processor generating first, second and third trigger time sets, a separate set corresponding to each of the three phases and including inter-set times comprising add, subtract and preserve times, each add time equal to an inter-set preserve time plus a delay period and each subtract time equal to the inter-set preserve time minus the delay period, the comparator comparing a first, a second and a third modified trigger time to the carrier count generating first, second and third trigger signals for controlling the inverter, each polarity sensor providing a polarity signal indicating current polarity in a separate one of the three motor phases, the apparatus for generating the first, second and third modified trigger times, the apparatus comprising:

first, second and third compensation modules for providing the first, second and third modified trigger times, respectively, each compensation module including:
a decoder receiving the direction signal and a polarity signal corresponding to an associated motor phase and generating two decision signals including add and subtract signals, when the polarity signal is high and the direction signal is low, the subtract signal is low and the add signal is high, when the polarity signal is low and the direction signal is high, the add signal is low and the subtract signal is high and during other combinations of polarity and direction signals the add and subtract signals are low;
a storer receiving and storing the add, subtract and preserve times corresponding to an associated motor phase; and
a selector which receives the add and subtract signals and the add, subtract and preserve times and generates a modified trigger time, the modified trigger time equal to the add time when the add signal is high, equal to the subtract time when the subtract signal is high and equal to the preserve time when the add and subtract signals are low.

2. The apparatus of claim 1 wherein the decoder also generates a preserve signal which is high when both the direction and polarity signals are either high or low and provides the preserve signal to the selector, when the preserve signal is high, the selector providing the modified trigger time equal to the preserve time.

3. The apparatus of claim 2 wherein the processor also includes first, second and third data busses and first, second and third data lines linking the processor to the storers of the first, second and third compensation modules, respectively, the processor generating first, second and third select signals on the first, second and third data lines, sequentially providing times of a first set on the first bus, sequentially providing times of a second set on the second bus and sequentially providing times of a third set on the third bus, each select signal indicating which time of a set is instantaneously being received on a corresponding bus, the storer identifying which trigger time is instantaneously being received and storing the received trigger times accordingly.

4. An apparatus for use with a processor, a carrier signal generator, a comparator, three current polarity sensors and an inverter for controlling a three phase motor, the signal generator providing a carrier count signal and a direction signal, the direction signal being high when the carrier count is counting up and low when the carrier count is counting down, the processor generating first, second and third trigger times, a separate trigger time corresponding to each of the three phases, the comparator comparing a first, a second and a third modified trigger time to the carrier count generating first, second and third trigger signals for controlling the inverter, each polarity sensor providing a polarity signal indicating current polarity in a separate one of the three motor phases, the apparatus for generating the first, second and third modified trigger times, the apparatus comprising:

first, second and third compensation modules for providing the first, second and third modified trigger times, respectively, each compensation module including:

a decoder receiving the direction signal and a polarity signal corresponding to an associated motor phase and generating two decision signals including add and subtract signals, when the polarity signal is high and the direction signal is low, the subtract signal is low and the add signal is high, when the polarity signal is low and the direction signal is high, the add signal is low and the subtract signal is high and during other combinations of polarity and direction signals the add and subtract signals are low;

a storer receiving a trigger time corresponding to an associated motor phase, the storer subtracting a delay period from the trigger time to generate a subtract trigger time, adding a delay period to the trigger time to generate an add trigger time, storing the trigger time as a preserve trigger time and storing the add and subtract trigger times; and a selector which receives the add and subtract signals and the add, subtract and preserve trigger times and generates a modified trigger time, the modified trigger time equal to the add trigger time when the add signal is high, equal to the subtract trigger time when the subtract signal is high and equal to the preserve trigger time when the add and subtract signals are low.

5. The apparatus of claim 4 wherein the decoder also generates a preserve signal which is high when both the direction and polarity signals are either high or low and provides the preserve signal to the selector, when the preserve signal is high, the selector providing the modified trigger time equal to the preserve trigger time.

6. A method for use with a processor, a carrier signal generator, a comparator, three current polarity sensors and an inverter for controlling a three phase motor, the signal generator providing a carrier count signal and a direction signal, the direction signal being high when the carrier count is counting up and low when the carrier count is counting down, the processor generating first, second and third trigger time sets, a separate set corresponding to each of the three phases and including inter-set times comprising add, preserve and subtract times, each add time equal to an inter-set preserve time plus a delay period and each subtract time equal to the inter-set preserve time minus the delay period, the comparator comparing a first, a second and a third modified trigger time to the carrier count generating first, second and third trigger signals for controlling the inverter, each polarity sensor providing a polarity signal indicating current polarity in a separate one of the three motor phases, the method for generating the first, second and third modified trigger times, the method comprising the steps of:

receiving the direction signal and a polarity signal corresponding to an associated motor phase and generating two decision signals including add and subtract signals, when the polarity signal is high and the direction signal is low, the subtract signal is low and the add signal is high, when the polarity signal is low and the direction signal is high, the add signal is low and the subtract signal is high and during other combinations of polarity and direction signals the add and subtract signals are low;

storing the add, subtract and preserve times corresponding to an associated motor phase; and receiving the add and subtract signals and the add, subtract and preserve times and generating a modified trigger time, the modified trigger time equal to the subtract time when the subtract signal is high, equal to the add time when the add signal is high and equal to the preserve time when the add and subtract signals are low.

7. The method of claim 6 further including the step of generating a preserve signal which is high when both the direction and polarity signals are either high or low, the step of receiving the add and subtract signal includes the step of receiving the preserve signal and the step of generating a modified trigger time includes the step of setting the modified trigger time equal to the preserve time when the preserve signal is high.

8. An method for use with a processor, a carrier signal generator, a comparator, three current polarity sensors and an inverter for controlling a three phase motor, the signal generator providing a carrier count signal and a direction signal, the direction signal being high when the carrier count is counting up and low when the carrier count is counting down, the processor generating first, second and third trigger times, a separate trigger time corresponding to each of the three phases, the comparator comparing a first, a second and a third modified trigger time to the carrier count generating first, second and third trigger signals for controlling the inverter, each polarity sensor providing a polarity signal indicating current polarity in a separate one of the three motor phases, the method for generating the first, second and third modified trigger times, the method comprising the steps of:

receiving the direction signal and a polarity signal corresponding to an associated motor phase and generating two decision signals including add and subtract signals, when the polarity signal is high and the direction signal is low, the subtract signal is low and the add signal is high, when the polarity signal is low and the direction signal is high, the add signal is low and the subtract signal is high and during other combinations of polarity and direction signals the add and subtract signals are low;

receiving a trigger time corresponding to an associated motor phase;

subtracting a delay period from the trigger time to generate a subtract trigger time;

adding the delay period to the trigger time to generate an add trigger time;

storing the trigger time as a preserve trigger time and storing the add and subtract trigger times; and receiving the add and subtract signals and the add, subtract and preserve trigger times and generates a modified trigger time, the modified trigger time equal to the add trigger time when the add signal is high, equal to the subtract trigger time when the subtract signal is high and equal to the preserve trigger time when the add and subtract signals are low.

9. The method of claim 8 further including the step of generating a preserve signal which is high when both the direction and polarity signals are either high or low, the step of receiving the add and subtract signal includes the step of receiving the preserve signal and the step of generating a modified trigger time includes the step of setting the modified trigger time equal to the preserve trigger time when the preserve signal is high.

* * * * *